(No Model.)

G. OTTO.
CONNECTOR FOR ELECTRIC BATTERIES.

No. 324,410. Patented Aug. 18, 1885.

WITNESSES:
A. Schehl
John M. Speer

INVENTOR
G. Otto
BY Briesen & Steele
ATTORNEYS

UNITED STATES PATENT OFFICE.

GUSTAV OTTO, OF JERSEY CITY, NEW JERSEY.

CONNECTOR FOR ELECTRIC BATTERIES.

SPECIFICATION forming part of Letters Patent No. 324,410, dated August 18, 1885.

Application filed April 23, 1885. (No model.)

*To all whom it may concern:*

Be it known that I, GUSTAV OTTO, a resident of Jersey City Heights, in the county of Hudson and State of New Jersey, have invented an Improved Circuit-Closer for an Electric Battery, of which the following is a full, clear, and exact description, reference being made to the accompanying drawings, in which—

Figure 1:
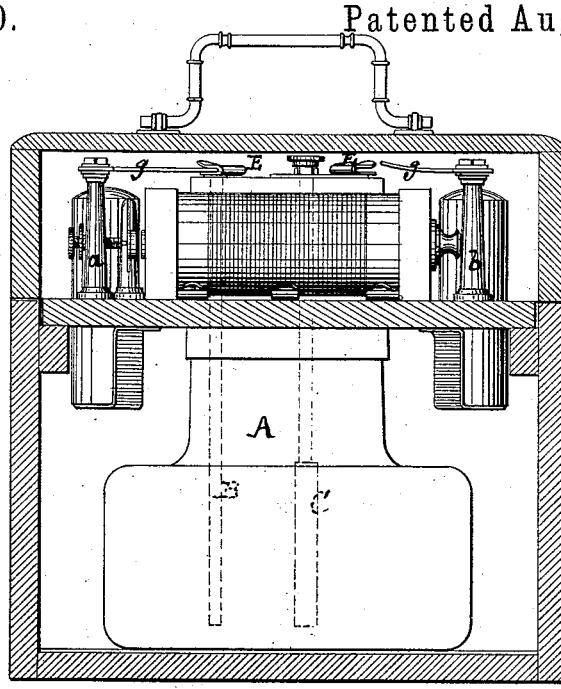
Figure 5:
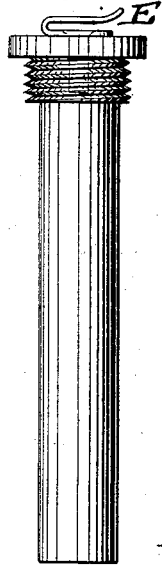
Figure 2:
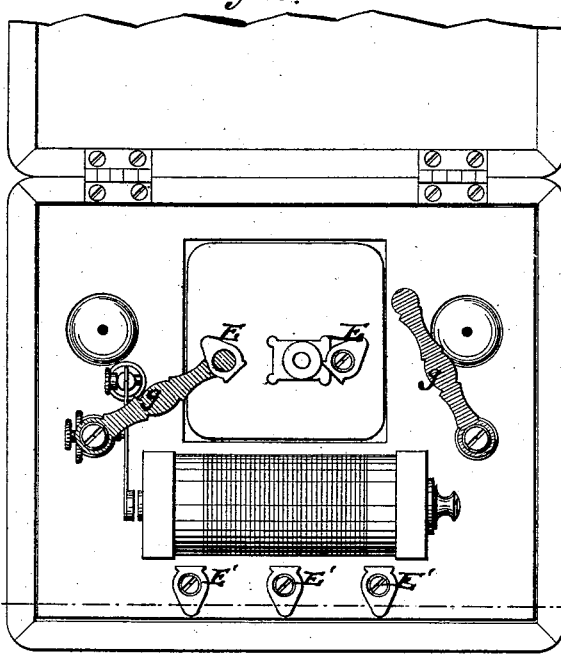
Figure 3:
Figure 4:
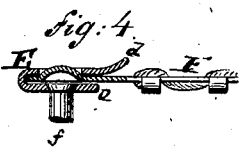

Figure 1 represents a sectional elevation of an electric battery having my improved circuit-closer. Fig. 2 is a top view of the same. Fig. 3 is an enlarged top view of the circuit-closer. Fig. 4 is a central section of the same. Fig. 5 is a side view of the same, showing it applied to one of the electrodes of a battery.

This invention relates to a new construction of spring-clip, which, when applied to the proper parts of an electric battery, will constitute a coupling or device by which a circuit may be closed whenever desired. The spring-clip to which I refer is U-shaped in cross-section, each of its arms being perforated, as hereinafter more fully specified.

In the drawings, the letter A represents the vase of a suitable battery, in which B and C are the electrodes. *a* and *b* are posts, which are to be connected with the electrodes of the battery whenever the latter is to be set in action. With each of the electrodes of the battery is connected a spring-clip, E, which is of the construction more clearly represented in Fig. 3—that is to say, it is made of one piece of metal bent to form two wings, *d* and *e*, which are substantially parallel with one another. These wings are perforated, so that the lower wing, *e*, may receive the head *f* of the fastening screw or pin, while the perforation of the upper wing, *d*, is utilized for the purpose of receiving the screw-driver or instrument by means of which the screw *f* is turned or secured in place. The arms *d e* constitute a spring, between which the metal connecting-link may be readily inserted, and by which it will be held with sufficient rigidity. Thus, referring again to Fig. 1, in order to connect the posts *a b* with the respective electrodes, the said posts are provided with swinging or pivoted extensions *g g*, which, when the free ends thereof are inserted between the spring-arms of the clips E, will make the desired metallic connection. This connection will be sufficiently thorough for practical purposes, and much more thorough than the ordinary mere contact-connection—that is to say, than a connection which would, for example, result from placing one of the rods *g* simply upon the clip E, instead of placing it between the arms thereof.

To fasten each clip in place by means of a screw or other pin, either a screw-driver or other driving-tool may be made use of, the perforations in the arms *d e*, respectively, admitting of the convenient application thereof. The clips E are not only useful for connecting the electrodes of the battery with the conductors thereof, but can also be used in all other suitable positions—wherever, in fact, electric connection is to be established. Thus in Fig. 2 are shown a series of such clips, which are marked E', and which, in a medical electric instrument of the kind illustrated, will serve to establish the connection with the conductors that go to the human body, which conductors may be wires or flat plates of metal, as indicated at F in Fig. 4. In fact, I do not confine myself to any specific manner of application of my improved clip. In Fig. 5 the clip is represented as applied to an electrode of a different kind of a battery than the particular kind shown in the other figures.

I claim—

The spring-clip E, having perforated arms *d e*, the apertures whereof are in line, as and for the purpose set forth.

GUSTAV OTTO.

Witnesses:
HARRY M. TURK,
GUSTAV SCHNEPPÉ.